(12) United States Patent
Mita et al.

(10) Patent No.: US 6,955,047 B2
(45) Date of Patent: Oct. 18, 2005

(54) MASTER CYLINDER

(75) Inventors: Katsuhiro Mita, Gamagouri (JP); Atsushi Yasuda, Toyoake (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/441,220

(22) Filed: May 20, 2003

(65) Prior Publication Data

US 2004/0000813 A1 Jan. 1, 2004

(30) Foreign Application Priority Data

May 29, 2002 (JP) .............................. 2002-155468

(51) Int. Cl.$^7$ ......................................... B60T 13/567
(52) U.S. Cl. ..................................................... 60/547.1
(58) Field of Search ...................... 60/547.1; 91/376 R

(56) References Cited

U.S. PATENT DOCUMENTS

| | | | | |
|---|---|---|---|---|
| 2,832,316 A | * | 4/1958 | Ingres ........................ | 60/547.1 |
| 3,035,551 A | * | 5/1962 | Rike .......................... | 60/547.1 |
| 3,172,335 A | * | 3/1965 | Brooks et al. ............. | 91/376 R |
| 3,321,916 A | * | 5/1967 | Cripe ......................... | 91/376 R |
| 5,438,833 A | | 8/1995 | Ishihara | |
| 5,537,821 A | * | 7/1996 | Sunohara et al. ........... | 60/547.1 |
| 6,065,291 A | * | 5/2000 | Tsubouchi .................. | 60/547.1 |
| 6,141,963 A | | 11/2000 | Gotoh et al. | |

FOREIGN PATENT DOCUMENTS

| | | |
|---|---|---|
| JP | 63-1635 Y2 | 1/1988 |
| JP | 3-82668 U | 8/1991 |
| JP | 4-42219 B2 | 7/1992 |
| JP | 8-2002 Y2 | 1/1998 |
| JP | 11-198793 A | 7/1999 |

* cited by examiner

*Primary Examiner*—F. Daniel Lopez
(74) *Attorney, Agent, or Firm*—Burns, Doane, Swecker & Mathis LLP

(57) ABSTRACT

Disclosed is a master cylinder wherein a seal member is given plural seal functions to reduce the number of seal members for partitioning a drain portion of the master cylinder, a constant-pressure chamber of a booster and the atmosphere from one another, so that the master cylinder is simplified in construction and reduced in manufacturing cost. When a piston is operated by an output shaft of the booster attached to a booster mounting surface of a cylinder body, the operating fluid from the fluid pressure chamber partitioned by a fluid-tight seal member is supplied to a brake system. An annular complex seal member is fit in an internal seal stepped portion which is formed by radially expanding an opening portion of the cylinder which opens to a booster mounting surface. A slide seal portion of the complex seal member partitions a drain portion behind the fluid-tight seal member from the constant-pressure chamber of the booster through sliding contact with the piston. An air-tight seal portion of the complex seal member partitions the constant-pressure chamber from the atmosphere through abutting engagement with the front end surface of the booster. Further, a fixed seal portion of the complex seal member partitions the drain portion from the atmosphere through abutting engagement with the internal surface of an internal seal stepped portion.

5 Claims, 10 Drawing Sheets

MASTER CYLINDER

INCORPORATION BY REFERENCE

This application is based on and claims priority under 35 U.S.C. sctn. 119 with respect to Japanese Application No. 2002-155468 filed on May 29, 2002, the entire content of which is incorporated herein by reference.

BACKGROUND OF THE INVENTION

1. Field of the Invention

The present invention relates to a master cylinder provided bodily with a booster which augments the stepping force on a brake pedal of a vehicle.

2. Discussion of the Related Art

Heretofore, there has been known a master cylinder provided bodily with a negative-pressure operated booster which augments the stepping force on a brake pedal, as described in Japanese examined utility model No. 63-1635 (1988-1635). In the know device, a cylinder body is formed with a cylinder, which opens to a booster mounting surface of the cylinder body mounting a booster. A piston which has the rear end thereof entering a constant-pressure chamber of the booster and which is operated by an output shaft of the booster is inserted into a piston guide secured to the cylinder. A fluid-tight seal member inserted into the cylinder is secured to the piston for defining the front area as a fluid pressure chamber. The cylinder is formed with a drain hole, which makes the fluid pressure chamber communicate with a reservoir when the piston is retracted to an inoperative position, but opens to a drain area behind the fluid-tight seal member when the piston is advanced. The piston guide is formed with an internal bore through which a small diameter portion of the piston passes and is in close contact at a flange portion thereof with the end surface of an annular protruding portion of the cylinder body entering the constant-pressure chamber. The flange portion is formed with an internal seal stepped portion by enlarging an opening end portion of the internal bore and is also formed with an external seal stepped portion by diminishing the end portion of the external surface of the piston guide. The piston guide and the annular protruding portion are kept in close contact with each other and are covered by a cover member which is drawn toward the booster mounting surface as being engaged with a booster shell of the booster secured to the booster mounting surface. A slide seal member is fit in the internal seal stepped portion for sliding contact with an external surface of the piston thereby to fluid-tightly partition the drain portion from the constant pressure chamber, while a fluid-tight seal member is fit between the external seal stepped portion and the cover member thereby to fluid-tightly partition the drain portion from the constant-pressure chamber. At an engagement portion between the booster shell and the cover member, another seal member is interposed between both of the booster shell and the cover member and the booster mounting surface for partitioning the constant-pressure chamber from the atmosphere and also for partitioning the drain area from the atmosphere.

However, in the prior art master cylinder provided bodily with the booster, the piston guide and the annular protruding portion are closely contacted with each other and are covered by the cover member. Thus, the slide seal member and the fluid-tight seal member which are fit respectively in the internal and external seal stepped portions formed on the piston guide are to partition the drain area from the constant-pressure chamber. In addition, the seal member which is interposed between the both of the booster shell and the cover member and the booster mounting surface of the cylinder body is also to partition the constant-pressure chamber from the atmosphere as well as to partition the drain area from the atmosphere. That is, the prior art arrangement disadvantageously requires to use many seal elements and results not only in complication in configuration but also in an increase in manufacturing cost.

SUMMARY OF THE INVENTION

Accordingly, it is a primary object of the present invention to provided an improved master cylinder capable of reducing the number of the seal members partitioning the drain area of the master cylinder, the constant-pressure chamber of the booster and the atmosphere from one another and capable of being simplified in construction, being easy to assemble and being reduced in manufacturing cost.

Briefly, in a master cylinder according to the present invention, a cylinder body is formed with a cylinder opening to a booster mounting surface of the cylinder body, the booster mounting surface is formed for mounting a booster thereon, and a piston enterers a constant-pressure chamber of said booster at a rear end portion thereof and is operable by an output shaft of said booster. A piston guide is provided at the rear end portion of the cylinder for slidably guiding the piston inserted thereinto, and a fluid-tight seal member is provided between the cylinder and the piston for fluid-tightly partitioning the front portion of the cylinder as a fluid pressure chamber. A drain port opens at a drain portion which the fluid-tight seal member defines at the rear portion of the cylinder for communicating with a reservoir, and an internal seal stepped portion formed by radially outwardly enlarging an opening portion of the cylinder which opens to the booster mounting surface. An annular spacing is formed by partitioning the internal seal stepped portion with the front end surface of the booster secured to the booster mounting surface and with the external surface of the piston, and an annular complex seal is fit in the annular spacing. The annular complex seal includes a slide seal portion formed at the internal surface of the complex seal member for fluid-tightly partitioning the drain portion and the constant-pressure chamber from each other in sliding contact with the external surface of the piston, an air-tight seal portion formed at the rear end surface of said complex seal member for air-tightly partitioning the constant-pressure chamber from the atmosphere in contact with the front end surface of the booster, and a fixed seal portion formed at the external surface of the complex seal member for fluid-tightly partitioning the drain portion from the atmosphere in contact with the internal surface of the internal seal stepped portion.

With this configuration, when the piston is operated by the output shaft of the booster mounted on the booster mounting surface of the cylinder body, the operating fluid from the fluid pressure chamber partitioned by the fluid-tight seal member is supplied to a brake system. The annular complex seal member is fit in the internal seal stepped portion which is formed by radially enlarging the opening portion of the cylinder which opens to the booster mounting surface. The slide seal portion of the complex seal member partitions the drain portion of the cylinder, having the drain hole opening behind the fluid-tight seal member which partitions the front portion of the cylinder as the fluid pressure chamber, from the constant-pressure chamber of the booster through sliding contact with the piston. The air-tight seal portion formed at the rear end surface of the complex seal member partitions the constant-pressure chamber of the booster from the atmosphere through abutting engagement with the front end surface of the booster. Further, the fixed seal portion of the complex seal member partitions the drain portion from the atmosphere through abutting engagement with the internal surface of the internal seal stepped portion.

In this manner, the complex seal member fit in the internal seal stepped portion opening to the booster attaching surface and sandwiched by the front end surface of the booster can partition various members from one another. Thus, the complex seal member is substituted for the plural seal members used in the prior art device, so that simpler construction for partitioning, easier assembling of the device and reduced manufacturing cost can advantageously be realized.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 7A:
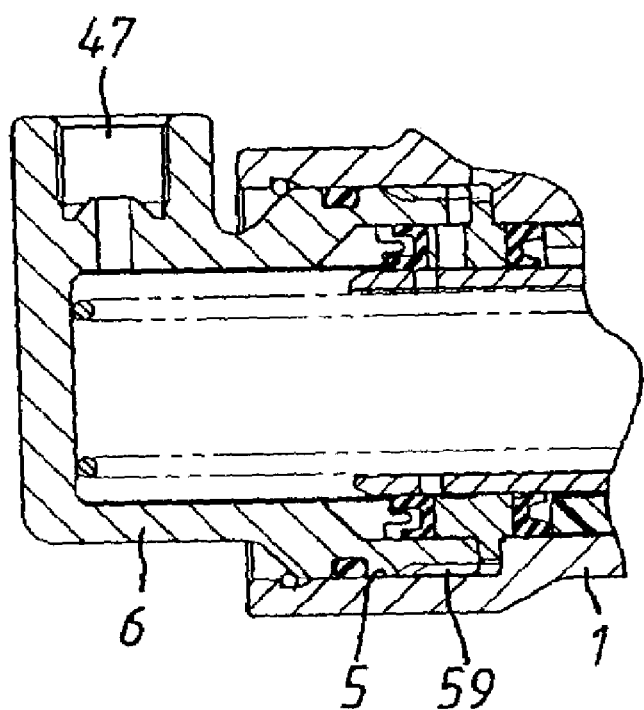
Figure 7B:
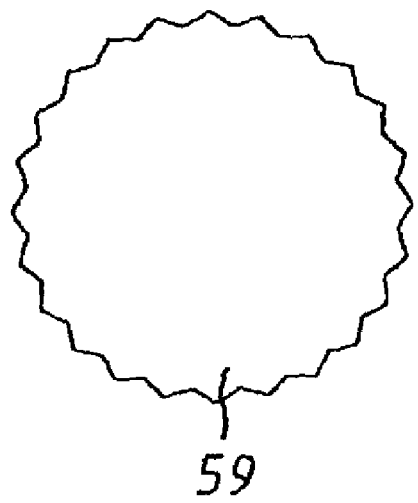
Figure 8:
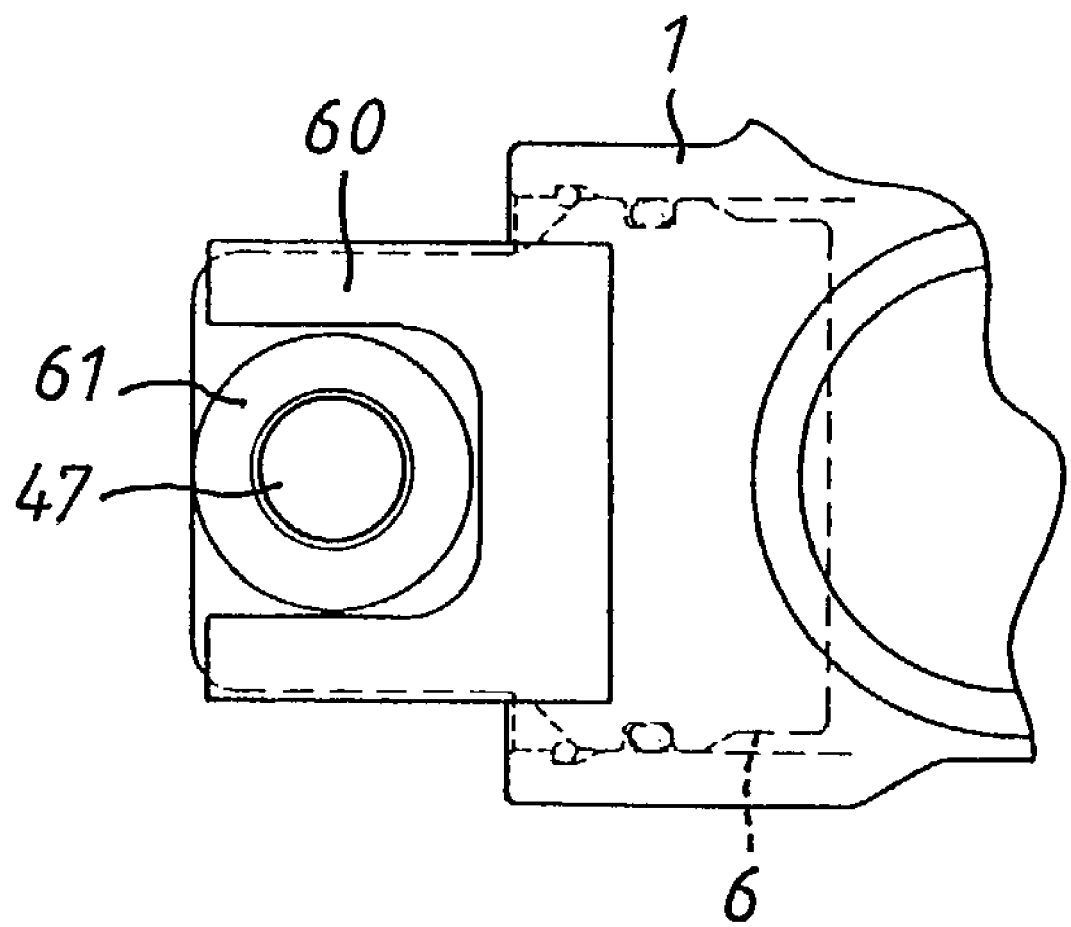
Figure 9:
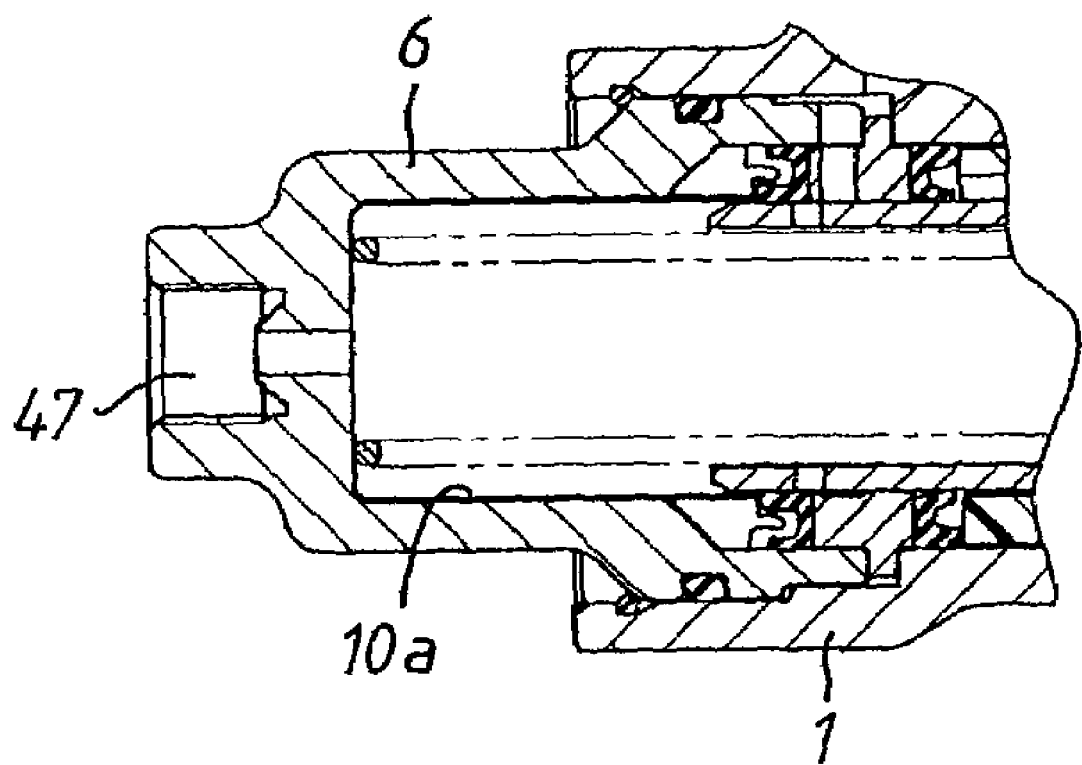
Figure 10:
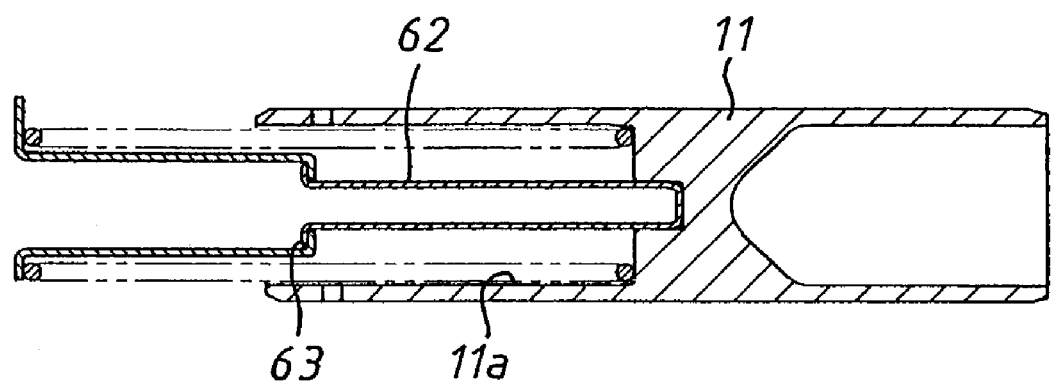

FIGS. 7(a) and 7(b) show an example of means for positioning a cap in the rotational direction by means of knurl;

FIG. 8 shows another example of means for positioning a cap in the rotational direction;

FIG. 9 is a sectional view showing another modification of the cap;

FIG. 10 is a sectional view of a rod made by deep drawing; and

Figure 11:
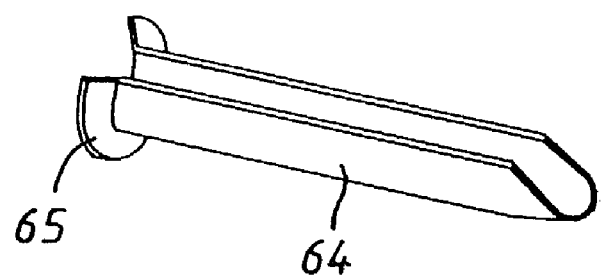

FIG. 11 is a perspective view of a rod which is made by press-forming a metallic plate to a C-letter shape in cross-section.

DETAILED DESCRIPTION OF THE PREFERRED EMBODIMENTS (First Embodiment)

Figure 1:
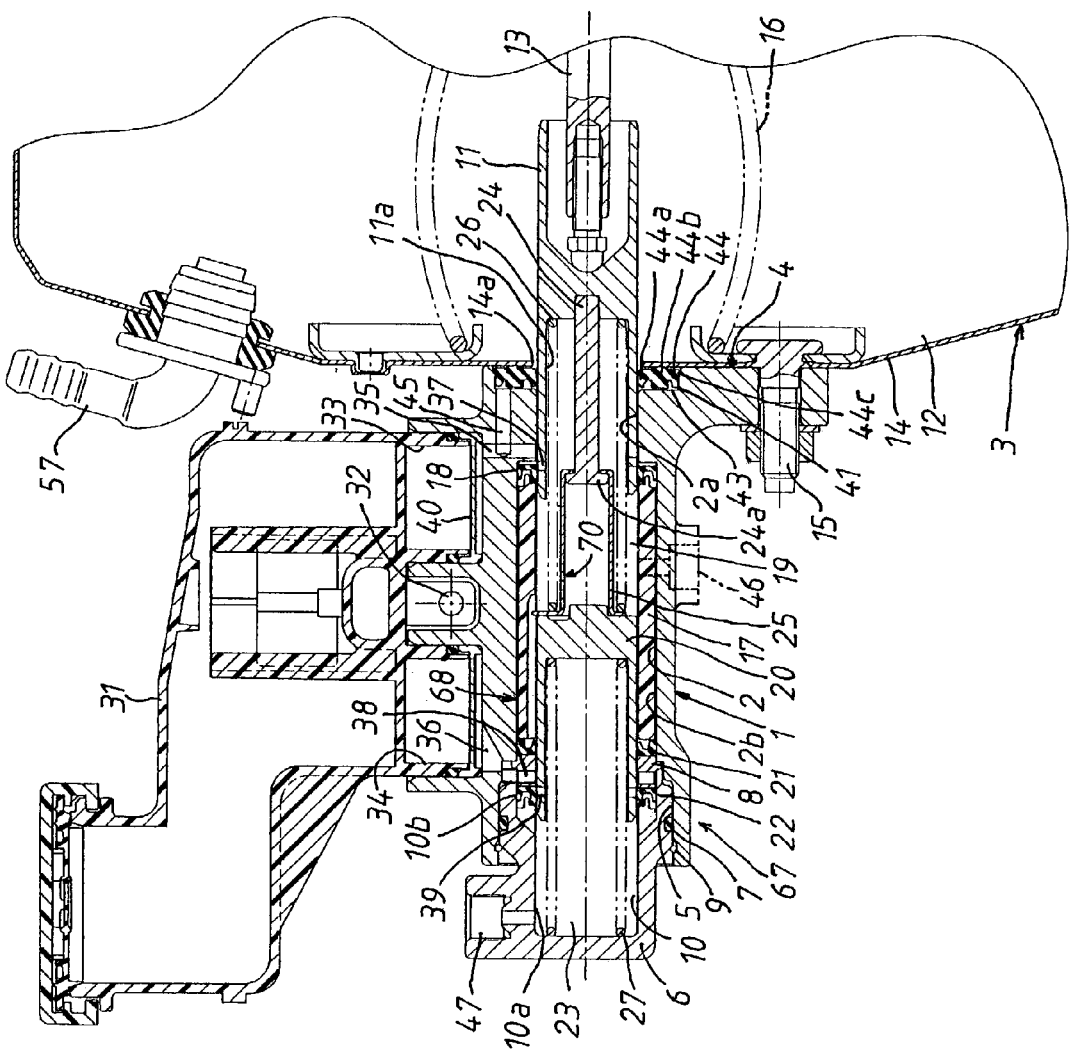
FIG. 1 is a longitudinal sectional view of a master cylinder according to the first embodiment of the present invention.
Figure 2:
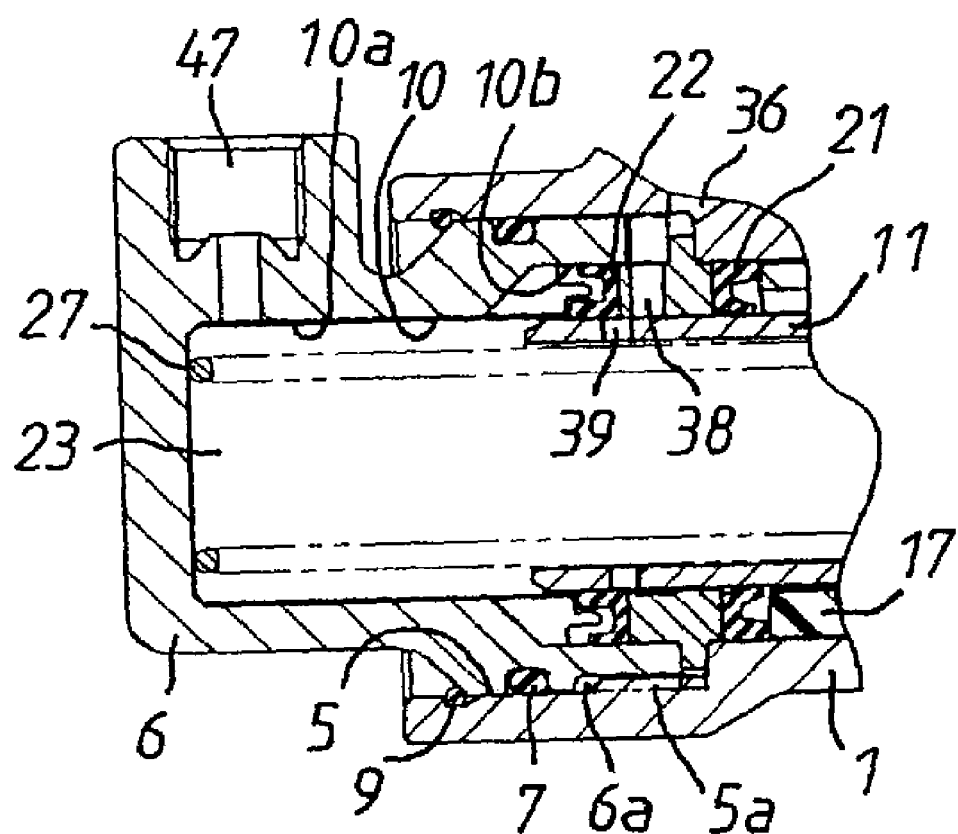
FIG. 2 is an enlarged, fragmentary view of a cap formed with a second cylinder in the first embodiment.

A master cylinder according to the first embodiment of the present invention will be described hereinafter with reference to the accompanying drawings. Referring now to FIG. 1, a cylinder body 1 is shown formed with a first cylinder 2 of a stepped cylindrical shape. A small diameter portion 2a of the first cylinder 2 opens to a booster mounting surface 4 which is formed to mount a booster 3 on the cylinder body 1. At the front end of the cylinder body 1, a cap attaching hole 5 is formed coaxially with the first cylinder 2 and is enlarged in diameter from the front end of a large diameter portion 2b of the first cylinder 2. A cap 6 is inserted into the cap attaching bore 5 to be fluid-tightly partitioned by means of an O-ring 7. A second metallic piston guide 8 of an annular shape is put between a stepped portion at the rear end surface of the cap attaching bore 5 and the end surface of the cap 6 and is secured to be prevented using a C-ring 9 from coming off or being dislocated from the cap attaching bore 5. As best shown in FIG. 2, an engagement protrusion 5a of a single lead extends in the axial direction at the bottom portion of the cap attaching bore 5. The engagement protrusion 5a is engaged with one of three concave grooves 6a which are formed at the end surface of the cap 6 to extend in the axial direction. By the engagement of the protrusion 5a with the groove 6a, the cap 6 is oriented toward such angular position that is suitable for supplying pressurized fluid from the second fluid pressurized chamber 23 to a second brake system (not shown), and is secured to the cylinder body 1 to be prevented from being rotated. Within the cap 6, a second stepped cylinder 10 is formed in co-axial alignment with the first cylinder 2. The second cylinder 10 is composed of a small diameter portion 10a having a bottom end and a large diameter portion 10b receiving a front protruding portion of the second piston guide 8. As described above, the cylinder body 67 is constituted by the cylinder body 1 and the cap 6 which is fixedly inserted into the cap attaching bore 5 formed at the front end of the cylinder body 1, and the cylinder 68 is constituted by the first cylinder 2 formed in the cylinder body 1 and the second cylinder 10 formed in the cap 6.

The small diameter portion 2a of the first cylinder 2 serves as a first piston guide and slidably inserts thereinto a first piston 11, in which an axial hole 11a with a bottom portion is formed to extend from the front end surface thereof to the end surface of the bottom portion. The rear end portion of the first piston 11 enters the constant-pressure chamber 12 of the booster 3 and is operable by an output shaft 13 of the booster 3. The booster 3 is a power augmenting device for augmenting brake fluid pressure which is generated when a brake pedal is stepped on. The booster 3 includes a booster shell 14 forming an interior chamber which is partitioned by a diaphragm into the constant-pressure chamber and a variable-pressure chamber. The constant-pressure chamber is kept at a negative-pressure by communicating with an intake manifold of an engine (not shown) through a negative-pressure lead pipe 57. When a pressure difference is generated between the constant-pressure chamber and the variable-pressure chamber as a result of a valve (not shown) being operated upon the stepping-on of the brake pedal, the diaphragm is urged forwardly (to the left in FIG. 1) so that with the stepping-on force being augmented, the output shaft 13 connected to the diaphragm pushes the first piston 11 forward. The booster shell 14 is formed with an insertion hole 14a, through which the first piston 11 enters the constant-pressure chamber to come into contact with the front end of the output shaft 13. The diaphragm is urged rearward by means of a return spring 16 and keeps the output shaft 13 retracted to a home position in the inoperative state.

A first fluid-tight seal member 18 is fit on the external surface of the first piston 11 to partition the cylinder 68 as the first fluid-pressure chamber 19 for supplying pressurized brake fluid to the first brake system. The first fluid-tight seal member 18 is in contact with the front end surface of the small diameter portion 2a of the first cylinder 2 serving as the first piston guide. A fluid-tight seal member 21 which defines the front end surface of the first fluid pressure chamber 19 is slidably fit on the external surface of the second piston 20 and is in contact with the back surface of the second piston guide 8. Within the large diameter portion 2b of the first cylinder 2, a sleeve 17 made of resin is inserted with a play between the first fluid-tight seal member 18 and the fluid-tight seal member 21 for keeping the fluid-tight seal member 21 and the first fluid-tight seal member 18 at respective predetermined positions therefor by preventing the members 21 and 18 from moving in the axial direction. The first piston 11 is fit in the sleeve 17 to be movable in the axial direction. As described above, the first fluid-tight seal member 18 is provided between the first piston 11 and the cylinder 68 and partitions the rear part of the cylinder 68 as a first fluid pressure chamber 19 for supplying pressurized brake fluid to the first brake system.

A second piston 20 is slidably inserted into an internal hole formed in the second piston guide 8. The second piston 20 is slidably inserted at the front end portion thereof in the small diameter portion 10a of the second cylinder 10 and is inserted at the rear end portion into the sleeve 17 to enter the first fluid pressure chamber 19, so that the second piston 20 is moved when pressed by the pressurized fluid generated within the first fluid pressure chamber 19. Within the large diameter portion 10b of the second cylinder 10, a second fluid-tight seal member 22 is made to contact with the front end surface of the front protruding portion of the second piston guide 8 and is sandwiched at a stepped portion between the large diameter portion 10b and the small diameter portion 10a. The second fluid-tight seal member 22 is slidably fit over the external surface of the second piston 20 to partition the second cylinder 10 and the second piston 20 from each other. Thus, the front portion of the cylinder 68 is defined as a second fluid pressure chamber 23 for supplying a second brake system with pressurized brake fluid.

From the bottom surface of an axial hole 11a of the first piston 11, there is forwardly protruded a rod 24 as an engagement member, which is formed with an engagement portion 24a at the front end thereof. A numeral 25 denotes a spring seat of a bell shape, which is guided by the rod 24 at a hole formed at the rear end thereof and which is in engagement with the engagement portion 24a of the rod 24, so that the spring seat 25 is restrained from moving forward. A numeral 26 denotes a first compression spring interposed between a flange which is expanded radially outwardly at the front end of the spring seat 25 and the bottom surface of the axial hole 11a. The first compression spring 25 urges the spring seat 25 forward by a first set spring force until the spring seat 25 is engaged with the engagement portion 24a of the rod 24. In this way, the rod 24, the spring seat 25, the first compression spring 26 and the like constitutes spacing means 70 which is provided between the first piston 11 and the second piston 20 for urging the rod 24 and the spring seat 25 movable axially relatively to separate from each other by the fist set spring force of the first compression spring 26 to the engagement position where the engagement portion 24a and the spring seat 25 are restricted from moving from each other. In a modified form, the spacing means 70 may be constituted to protrude the rod 24 from the rear end surface of the second piston 20 and to make the flange portion of the spring seat 25 contact with the bottom surface of the axial hole 11a of the first piston 11.

A numeral 27 denotes a second compression spring interposed between the second piston 20 and the bottom surface of the small diameter potion 10a of the second cylinder 10 which bottom surface also serves as the front wall of the cylinder 68. The second compression spring 27 urges the second piston 20 rearward by a second set spring force smaller than the first set spring force and brings the second piston 20 into engagement with the spring seat 25.

A reservoir 31 is mounted on the top of the cylinder body 1 and is secured thereto by means of a pin 32. First and second output ports 33, 34 formed at the lower surface of the reservoir 31 are in fluid communication respectively with first and second supply ports 35, 36 which open to the top surface of the cylinder body for replenishing the operating fluid to the first and second fluid pressure chambers 19, 23. The first supply port 35 opens to the small diameter portion 2a of the first cylinder 2, and comes into communication with a supply hole 37 formed in the first piston 11 in the radial direction to open to the axial hole 11a when the first piston 11 is at the inoperative position. The internal surface portion of the small diameter portion 2a of the first cylinder 2 serves a first drain portion behind the first fluid-tight seal member 18, and the first supply port 35 also serves as a drain hole for making the first drain portion in communication with the reservoir 31.

The second supply port 36 communicates with a hole 38 which is formed in a radial direction at the front protruding portion of the second piston guide 8. The hole 38 communicates with a supply hole 39 radially formed at the annular portion of the second piston 20 when the same is at the inoperative position. The internal surface portion of the second piston guide 8 constitutes a second drain portion behind the second fluid-tight seal member 22. The second supply hole 36 and the hole 38 also serve as a drain hole for making the second drain portion communicate with the reservoir 31. A numeral 40 denotes a filter set at the bottom portion of the reservoir 31.

An opening portion of the first cylinder 2 opening to the booster mounting surface 4 of the cylinder body 1 is radially outwardly enlarged to form an internal seal stepped portion 41. The internal seal stepped portion 41 is defined as an annular spacing 43, which is defined by a shoulder portion and the internal surface of the portion 41 and the front surface of the booster shell 42 of the booster 3 fixed in contact with the booster mounting surface 4, and the external surface of the first piston 11. An annular complex seal member 44 fit in the annular spacing 43, and is formed at an internal surface thereof with a slide seal portion 44a which is in sliding contact with the external surface of the first piston 11 thereby to fluid-tightly partition the first drain portion 2a and the constant-pressure chamber 12 from each other. The rear end surface of the complex seal member 44 is formed with an air-tight seal portion 44b, which is in contact with the front end surface of the booster shell 14 of the booster 3 to air-tightly partition the constant-pressure chamber 12 from the atmosphere. The external surface of the complex seal member 44 is formed with a fixed seal portion 44c, which is in contact with the internal surface of the internal seal stepped portion 41 to fluid-tightly partition the first drain portion 2a from the atmosphere. The bottom surface of the internal seal stepped portion 41 is in communication with the reservoir 31 through a hole 45 connected to the first supply port 35.

(Operation)

The operation of the first embodiment as constructed above will be described hereunder. When a brake pedal (not shown) is stepped on, a valve (not shown) of the booster 3 is operated to apply a certain pressure difference onto the diaphragm, and the output shaft 13 pushes the first piston 11 by the force to which the stepping-on force of the pedal is augmented. The forward movement of the first piston 11 causes the first fluid-tight seal member 18 to cut off the communication of the supply hole 37 with the first supply port 35. After the supply hole 37 is cut off, the first piston 11 is moved to increase the pressure of the operating fluid within the first fluid pressure chamber 19, so that the increased fluid pressure is supplied from the port 46 to the first brake system (not shown). With an increase in the fluid pressure within the first fluid pressure chamber 19, the second piston 20 is pressured forward, which causes the second fluid-tight seal member 22 to cut off the communication of the supply hole 39 with the second supply port 36. After this cutting-off of the communication, the fluid pressure in the second fluid pressure chamber 23 is increased by the forward movement of the second piston 20, whereby the increased pressurized fluid is supplied from the port 47 to the second bake system (not shown).

When the brake pedal is relieved of being steeped on, the output shaft 13 is retracted by means of the return spring 16 to the inoperative position to be stopped thereat. As the output shaft 13 is retracted, the first piston 11 is retracted by the spring force of the first compression spring 26 to such a position that the engagement portion 24a of the rod 24 comes into engagement with the spring seat 25. Thereafter, the first piston 11 is retracted by the spring force of the second compression spring 27 together with the second piston 20, and is positioned to the inoperative position upon engagement with the output shaft 13 now stopped at the inoperative position.

When the fluid pressure in the first fluid pressure chamber 19 does not increase due to the exhaust of air or an abnormality occurred in the first brake system, the first piston 11 is pushed by the output shaft 13 to advance against the spring force of the first compression spring 26. Thus, the front end of the first piston 11 pushes the second piston 20 forward via the flange of the spring seat 25, whereby the fluid pressure within the second fluid pressure chamber 23 is increased. The thrust force which is applied to the second fluid-tight seal member 22 with an increase in the fluid pressure of the second fluid pressure chamber 23 is surely supported by the second piston guide 8 made of metal. On the contrary, when the fluid pressure in the second fluid pressure chamber 23 does not increase, the first piston 11 is advanced forward by the forward movement of the output shaft 13, and the second piston 20 which is pushed by the spring seat 25 urged forward by the spring force of the first compression spring 26 is advanced forward against the spring force of the second compression spring 27. As a consequence, after the second piston 20 is stopped upon engagement of the front end thereof with the bottom surface of the second cylinder 10, the first piston 11 is further advanced, so that the fluid pressure within the first fluid pressure chamber 19 is increased.

At this time, the slide seal portion 44a which is formed at the internal surface of the annular complex seal member 44 fit in the annular spacing 43 is slidably engaged with the external surface of the first piston 11 to fluid-tightly partition the first drain portion 2a and the constant-pressure chamber 12 from each other. The air-tight seal portion 44b formed at the rear end surface of the complex seal member 44 is kept contacted with the front end surface of the booster shell 14 of the booster 3 thereby to air-tightly partition the constant-pressure chamber 12 from the atmosphere. Further, the fixed seal portion 44c formed at the external surface of the complex seal member 44 is kept contacted with the internal surface of the internal seal stepped portion 41 thereby to air-tightly partition the first drain portion 2a from the atmosphere. The bottom portion of the internal seal stepped portion 41 is in communication with the reservoir 31 via the hole 45 connected to the first supply port 35 and keeps the back surface of the complex seal member 44 at a low pressure.

As described above, in the first embodiment, when the first piston 11 is operated by the output shaft 13 of the booster 3 mounted on the booster mounting surface 4 of the cylinder body 1, the operating fluids from the first and second fluid pressure chambers 19, 23 of the cylinder 68 which are partitioned respectively by the first and second fluid-tight seal members 18, 22 are supplied respectively to the first and second brake systems. The annular complex seal member 44 is fit in the internal seal stepped portion 41 which is formed by radially enlarging the opening portion of the cylinder 68 which opens to the booster mounting surface 4. The slide seal portion 44a of the complex seal member 44 partitions the first drain portion of the cylinder 68, having the drain hole 35 opening behind the first fluid-tight seal member 18 which partitions the rear portion of the cylinder 68 as the first fluid pressure chamber 19, from the constant-pressure chamber 12 of the booster 3 through sliding contact with the first piston 11. The air-tight seal portion 44b formed at the rear end surface of the complex seal member 44 partitions the constant-pressure chamber 12 of the booster 3 from the atmosphere through abutting engagement with the front end surface of the booster 3. Further, the fixed seal portion 44c of the complex seal member 44 partitions the first drain portion from the atmosphere through abutting engagement with the internal surface of the internal seal stepped portion 41.

In this manner, the complex seal member 44 fit in the internal seal stepped portion 41 opening to the booster mounting surface 4 and sandwiched by the front end surface of the booster 3 can partitions various members from one another. Thus, the complex seal member 44 is substituted for the plural seal members used in the prior art device, so that there can be provided a tandem master cylinder which is simpler in construction for partitioning, is easier to assemble and is reduced in manufacturing cost.

(Second Embodiment)

Figure 3:
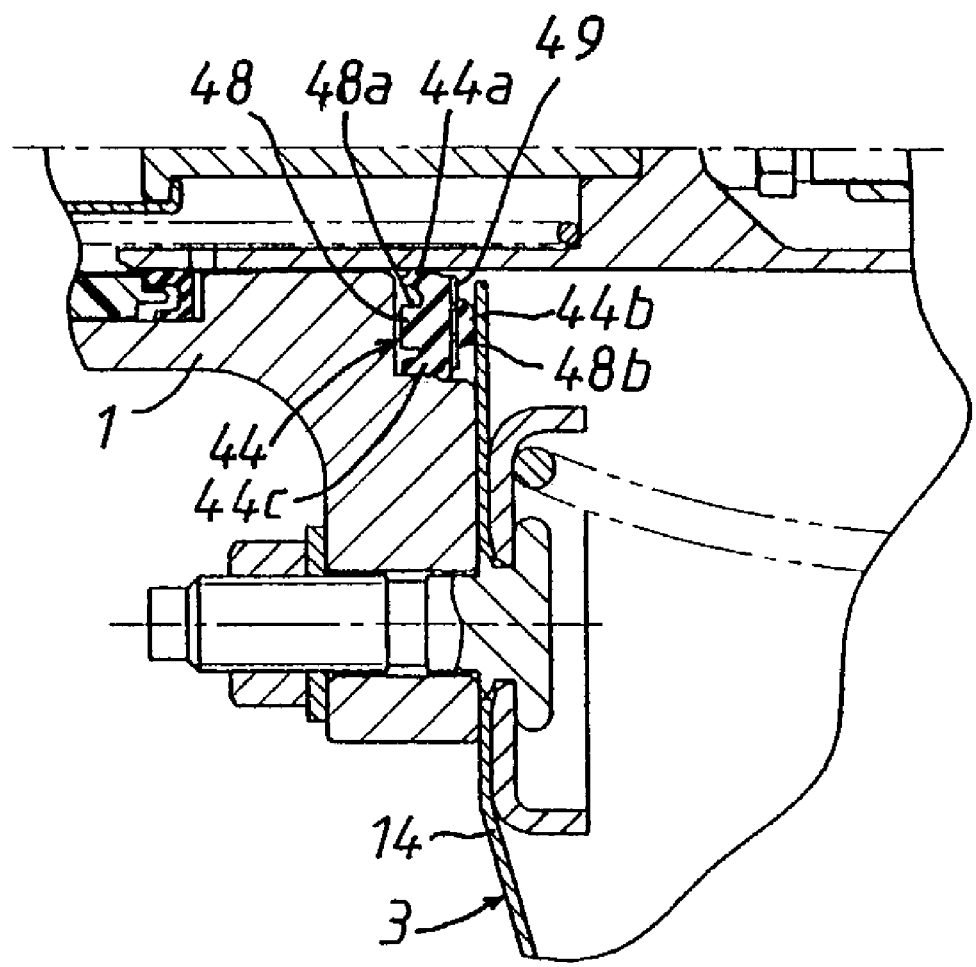
FIG. 3 is a longitudinal sectional view of a part of a master cylinder according to the second embodiment of the present invention.

In the second embodiment shown in FIG. 3, the complex seal member 44 is constituted by securing a reinforcing member 49 made of metal to a body portion 48 made of elastic material at a portion other than the seal portions 44a, 44b and 44c. More specifically, the body portion 48 made of elastic material is provided with a front end portion 48a having a sliding seal portion 44a and a fixed seal portion 44c and the rear end portion 48b having an air-tight portion 44b and embeds the metallic reinforcing member 49 of an annular shape between the front end portion 48a and the rear end portion 48b thereby to integrally form the complex seal member 44. Thus, the complex seal member 44 does not deform at other parts than the seal portions 44a, 44b and 44c, so that the partitioning abilities of the respective seal portions 44a, 44b and 44c and particularly, that of the air-tight seal portion 44b in close contact with the front end surface of the booster shell 14 of the booster 3 can be enhanced to ensure the reliable partitioning performance. In a modified form, the complex seal member 44 may take the constitution that the front end portion 48a and the rear end portion 48b are bodily baked respectively on the front and rear end surfaces of the annular metallic reinforcing member 49.

As described above, in the second embodiment, the complex seal member 44 is constituted by bodily securing the metallic reinforcing member 49 to the main body 48 made of elastic material at a portion but the seal portions.

Therefore, the complex seal member 44 does not deform as a whole, so that the ability to make close contact can be enhanced to improve the reliable partitioning performance.

(Third Embodiment)

Figure 4:
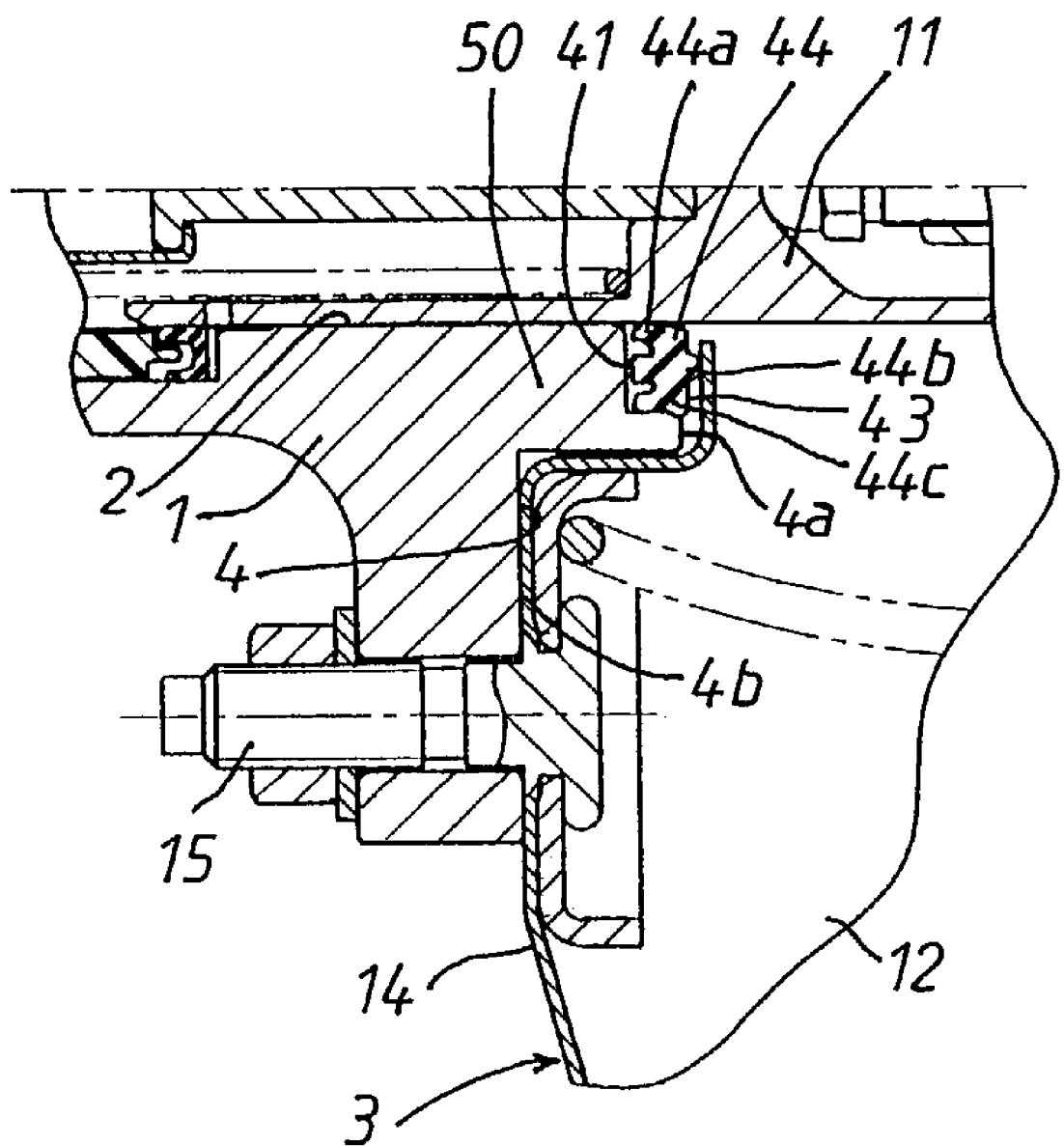
FIG. 4 is a longitudinal sectional view of a part of a master cylinder according to the third embodiment of the present invention.

In the third embodiment shown in FIG. 4, the cylinder body 1 is provided with an annular protruding portion 50 entering the constant-pressure chamber 12, and the booster mounting surface 4 is composed of a protruding mounting surface 4a defining the end surface of the annular protruding portion 50 and a mounting surface 4b including other end surfaces of the cylinder body 1 except for the annular protruding portion 50. The portion of the booster shell 14 contacted with the booster mounting surface 4 is bent along the external surface of the annular protruding portion 50 and the protruding mounting surface 4b, and the booster shell 14 is secured by means of bolts (one only shown) 15 to the mounting surface 4b. The opening portion of the first cylinder 2 which opens to the protruding mounting surface 4b is expanded radially outwardly to form the internal seal stepped portion 41. The internal seal stepped portion 41 is partitioned to form an annular spacing 43 by the shoulder portion and the internal surface of the portion 41, a portion of the booster shell 14 which portion is bent to face the protruding mounting surface 4a, and the external surface of the first piston 11, and the annular complex seal member 44 is fit in the annular spacing 44.

(Fourth Embodiment)

Figure 5:
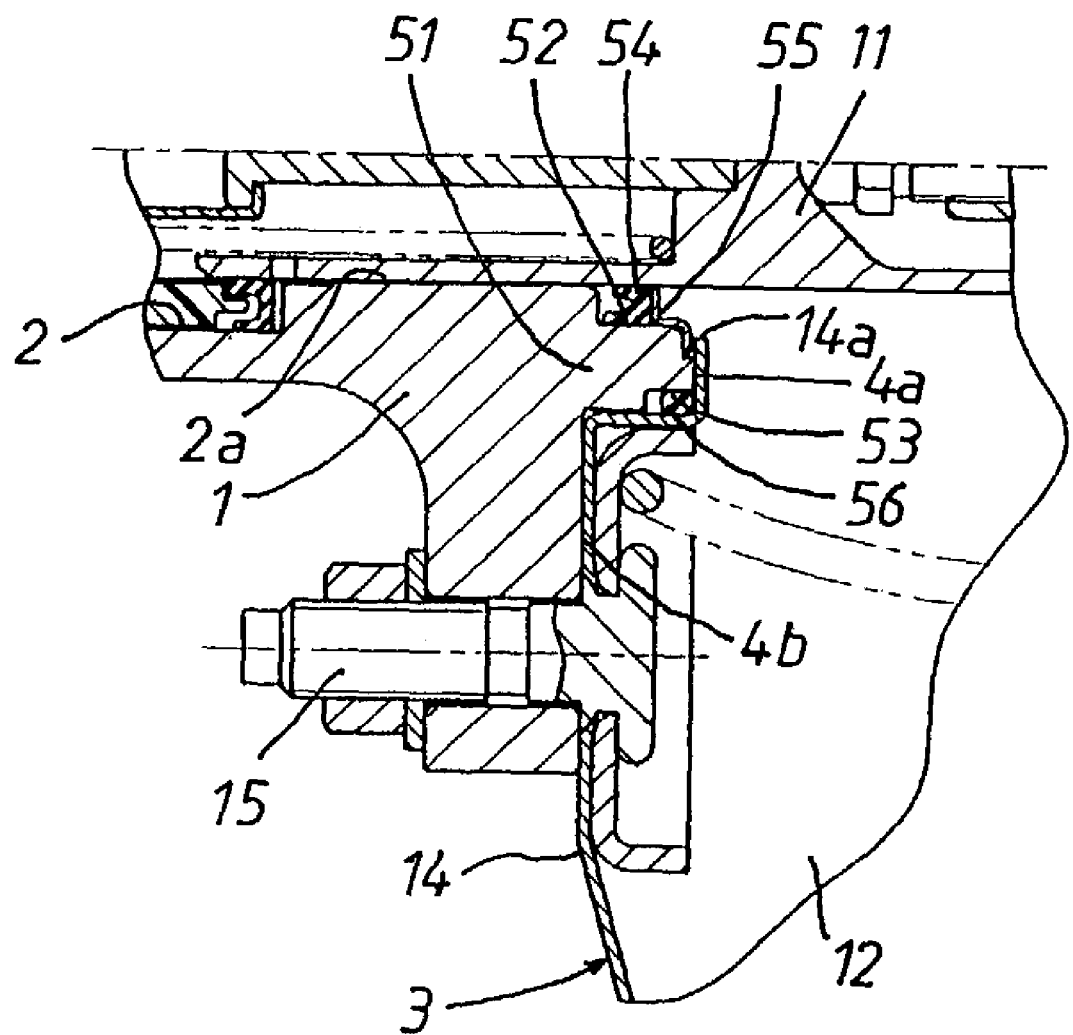
FIG. 5 is a longitudinal sectional view of a part of a master cylinder according to the fourth embodiment of the present invention.

In the fourth embodiment shown in FIG. 5, the cylinder body 1 is provided with an annular protruding portion 51 entering the constant-pressure chamber 12, and the booster mounting surface 4 is composed of a protruding mounting surface 4a defining the end surface of an annular protruding portion 51 and a mounting surface 4b comprising other end surfaces of the cylinder body 1 except for the annular protruding portion 51. The portion of the booster shell 14 contacted with the booster mounting surface 4 is bent along the external surface of the annular protruding portion 51 and the protruding mounting surface 4a, and the booster shell 14 is secured by means of the bolts (one only shown) 15 to the mounting surface 4b. The opening portion of the first cylinder 2 which opens to the protruding mounting surface 4a is expanded radially outwardly to form the internal seal stepped portion 52. The end portion of the external surface of the annular protruding portion 51 is contracted or diminished radially inwardly to form an external seal stepped portion 53.

Fit in the internal seal stepped portion 52 is a slide seal member 54 which is in sliding contact with the external surface of the first piston 11 to fluid-tightly partition the first drain portion 2a and the constant-pressure chamber 12 from each other. Further, an anti-falling-off plate 55 for preventing the slide seal member 54 from falling off is sandwiched between the protruding mounting surface 4a and the internal edge of the insertion hole 14a of the booster shell 14 in contact engagement with the back surface of the slide seal member 54. An air-tight seal member 56 is interposed between the external seal stepped portion 53 and a bent portion of the booster shell 14 for air-tightly partitioning the constant-pressure chamber 12 from the atmosphere.

As described above, in the fourth embodiment, the internal seal stepped portion 52 is formed by radially expanding the opening portion of the cylinder body 1 opening to the booster mounting surface 4, and the sliding seal member 54 is fit in the internal seal stepped portion 52 for sliding contact with the external surface of the first piston 11. The sliding seal portion of the seal member 54 fluid-tightly partitions the first drain portion 2a behind the fluid-tight seal member 18 from the constant-pressure chamber 12. The anti-falling-off plate 55 is in abutting engagement with the back surface of the sliding seal member 54 and is sandwiched between the end surface of the annular protruding portion 51 and the booster shell 14 to prevent the sliding seal member 54 from falling off. An air-tight seal member 56 in abutting engagement with the booster shell 14 is fit in the external seal stepped portion 53 which is formed by radially contracting or diminishing the end portion of the external surface of the annular protruding portion 51, and air-tightly partitions the constant-pressure chamber 12 from the atmosphere.

In this manner, the fluid-tight seal member 54 and the air-tight seal member 56 are fit respectively in the internal and external seal stepped portions 52, 53 which are formed respectively at the internal and external surfaces of the annular protruding portion 51 of the cylinder body 1, to partition the drain portion, the constant-pressure chamber 12 and the atmosphere from one another. Therefore, the number of seal members is reduced, so that simpler construction for partitioning, easier assembling of the device and reduced manufacturing cost can advantageously be realized.

(Other Modifications or Variations)

Figure 6:
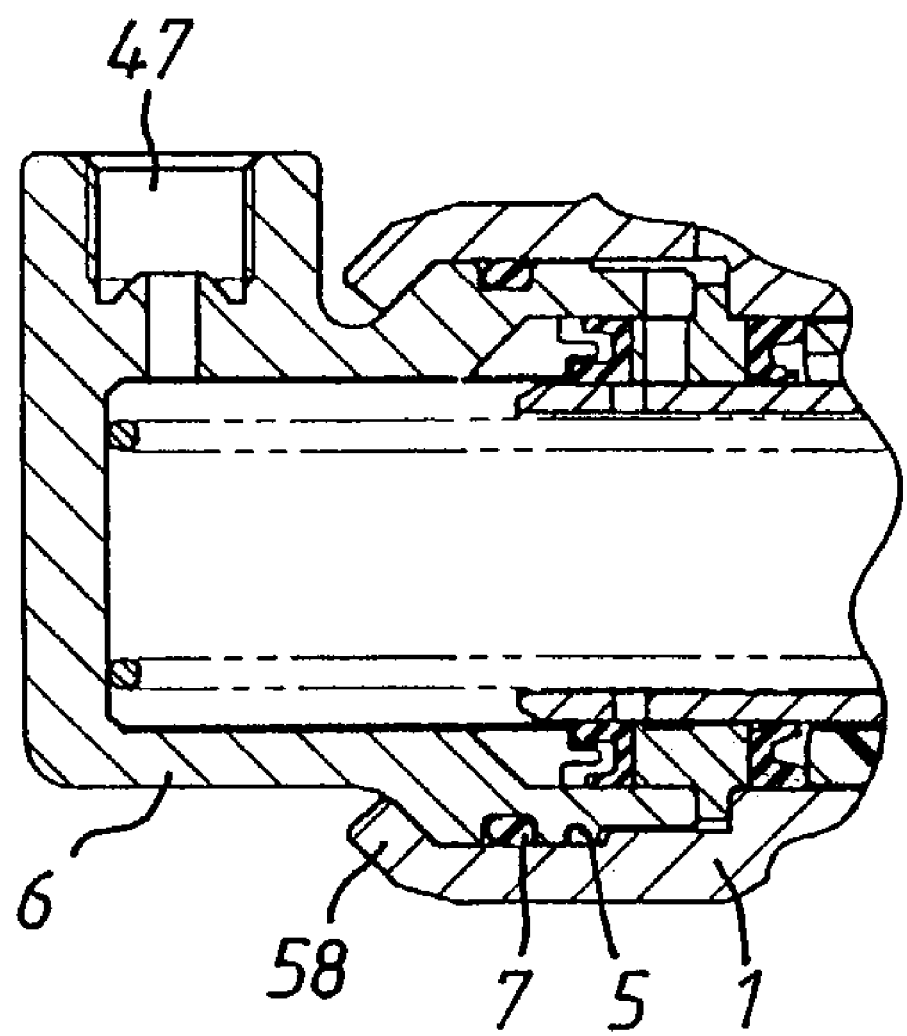
FIG. 6 is a fragmentary sectional view showing a modification of means for fitting a cup in a cap attaching hole and preventing it from falling off.

In the foregoing embodiments, the cap 6 is fit in the cap attaching bore 5 and is prevented by the C-ring 9 from falling off or being dislocated. However, in a modified form, as shown in FIG. 6, the cap 6 may be prevented from falling off by caulking or bending the opening edge portion 58 of the cap attaching bore 5 radially inwardly after being inserted into the cap attaching bore 5.

Further, in the foregoing embodiments, the cap 6 is secured to the cylinder body 1 and is prevented from rotating by engaging the engagement protrusion 5a protruded in the axial direction at the inmost portion of the cap attaching bore 5, with one of three concave grooves 6a axially formed at the opening edge portion of the cap 6, in a modified form, as shown in FIG. 7, complementary knurls 59 are formed on the external surface and the internal surface of the cap attaching bore 5, and the cap 6 is fit in the internal surface of the cap attaching bore 5 with the port 47 formed on the cap 6 being oriented toward a predetermined direction, whereby the rotation of the cap is prevented by the engagement of the complementary knurls 59. In a further modified form, the external surface of the cap 6 and the internal surface of the cap attaching bore 5 may take the form of complementary polygons, and the cap 6 is secured in a predetermined orientation through the engagement of the polygon surfaces thereby to be prevented from rotating.

In another modified form, as shown in FIG. 8, a bifurcated member 60 is extended from the front end of the cylinder body 1 at a pre-selected angular position, and the radially extending portion 61 of the cap 6 formed with the port 47 is engaged with the bifurcated member 60 with the port 47 being oriented toward a set angular position.

In a further modified form, as shown in FIG. 9, the port 47 is formed at the bottom of the cap 6 to open to the bottom surface of the small diameter portion 10a of the second cylinder 10.

In the foregoing embodiments, the rod 24 which is protruded from the bottom surface of the axis hole 11a of the first piston 11 with the engagement portion 24a being formed at the free end, is formed by turning a hollow shaft to a stepped shape. In a modified form, as shown in FIG. 10, a thin plate made of metal is subjected to deep drawing thereby to be made as a hollow rod portion 62 and is press-formed at the opening portion to form a flange 63 as the engagement portion 24a. A further modified form may be made, wherein as shown in FIG. 11, a plate made of metal is press-formed to a C-letter shape in cross-section to form a rod portion 64 and is further press-formed at the front end portion thereof to form a flange 65 as the engagement portion 24a.

Although the foregoing embodiments practice the present invention in a tandem master cylinder having first and second pistons, the application may be directed to a master cylinder with a single piston.

Obviously, numerous modifications and variations of the present invention are possible in light of the above teachings. It is therefore to be understood that within the scope of the appended claims, the present invention may be practiced otherwise than as specifically described herein.

What is claimed is:

1. A master cylinder comprising a cylinder body formed with a cylinder opening to a booster mounting surface of said cylinder body, said booster mounting surface being formed for mounting a booster thereon; a piston entering a constant-pressure chamber of said booster at the rear end portion thereof and operable by an output shaft of said booster; a piston guide provided at the rear end portion of said cylinder for slidably guiding said piston inserted thereinto; a fluid-tight seal member provided between said cylinder and said piston for fluid-tightly partitioning the front portion of said cylinder as a fluid pressure chamber; a drain port opening at a drain portion which said fluid-tight seal member defines at the rear portion of said cylinder for communicating with a reservoir; an internal seal stepped portion formed by radially outwardly expanding an opening portion of said cylinder which opens to said booster mounting surface; an annular spacing formed by partitioning said internal seal stepped portion with the front end surface of said booster secured to said booster mounting surface and with the external surface of said piston; and an annular complex elastomeric seal member fit in said annular spacing, wherein a first surface of said elastomeric seal member forms a slide seal portion formed at the internal surface of said complex seal member for fluid-tightly partitioning said drain portion and said constant-pressure chamber from each other in sliding contact with the external surface of said piston; a second surface of said elastomeric seal member forms an air-tight seal portion formed at the rear end surface of said complex seal member for air-tightly partitioning said constant-pressure chamber from the atmosphere in contact with the front end surface of said booster and a third surface of said elastomeric seal member forms a fixed seal portion formed at the external surface of said complex seal member for fluid-tightly partitioning said drain portion from the atmosphere in contact with the internal surface of the internal seal stepped portion, said slide seal portion, said air-tight seal portion and said fixed seal portion being formed as parts of a single seal.

2. A master cylinder as set forth in claim 1, wherein said complex seal member is constituted by bodily securing a reinforcing member made of metal to a body portion made of elastic material at a portion except for said seal portions of said complex seal member.

3. A master cylinder as set forth in claim 1, wherein said opening portion of said cylinder opening to the booster mounting surface extends toward said constant-pressure chamber beyond said booster mounting surface, and wherein a portion of a booster shell of said booster contacted with said opening portion of said cylinder is bent along said opening portion of said cylinder.

4. A master cylinder comprising a cylinder body formed with a cylinder opening to a booster mounting surface of said cylinder body, said booster mounting surface being formed for mounting a booster thereon; a first piston guide provided at the rear end portion of said cylinder; a first piston slidably guided in said first piston guide with the rear end portion entering a constant-pressure chamber of said booster and operable by an output shaft of said booster; a second piston guide provided at the middle portion of said cylinder; a second piston slidably inserted into said second piston guide; spacing means provided between said first and second pistons and including an engagement member and a spring seat axially movable relative to each other, said spacing means further including a first compression spring for urging said engagement member and said spring seat by a first set spring force to move in opposite directions to an engagement position where the said engagement member and said spring seat are restricted from relative movement; a second compression spring provided between said second piston and the front wall of said cylinder for urging said second piston to contact with said first piston by a second set spring force which is smaller than said first set spring force; first and second fluid seal members provided respectively between said first piston and said cylinder and between said second piston and said cylinder for partitioning said cylinder into first and second fluid pressure chambers respectively supplying pressurized brake fluids to first and second brake systems; first and second drain holes opening respectively at first and second drain portions defined behind said first and second fluid-tight seal members for communication with said reservoir; an internal seal stepped portion formed by radially outwardly expanding an opening portion of said cylinder which opens to said booster mounting surface; an annular spacing formed by partitioning said internal seal stepped portion with the front end surface of said booster secured to said booster mounting surface and with the external surface of said piston; and an annular complex elastomeric seal member fit in said annular spacing, wherein a first surface of said elastomeric seal member forms a slide seal portion formed at the internal surface of said complex seal member for fluid-tightly partitioning said drain portion and said constant-pressure chamber from each other in sliding contact with the external surface of said piston; a second surface of said elastomeric seal member forms an air-tight seal portion formed at the rear end surface of said complex seal member for air-tightly partitioning said constant-pressure chamber from the atmosphere in contact with the front end surface of said booster a third surface of said elastomeric seal member forms and a fixed seal portion formed at the external surface of said complex seal member for fluid-tightly partitioning said drain portion from the atmosphere in contact with the internal surface of the internal seal stepped portion, said slide seal portion, said air-tight seal portion and said fixed seal portion being formed as parts of a single seal.

5. A master cylinder comprising a cylinder body formed with a cylinder opening to a booster mounting surface of said cylinder body, said booster mounting surface being formed for mounting a booster thereon; a piston entering a constant-pressure chamber of said booster at the rear end portion thereof and operable by an output shaft of said booster; a piston guide provided at the rear end portion of said cylinder for slidably guiding said piston inserted thereinto; a fluid-tight seal member provided between said cylinder and said piston for fluid-tightly partitioning the front portion of said cylinder as a fluid pressure chamber; a drain port opening at a drain portion which said fluid-tight seal member defines at the rear portion of said cylinder for communicating with a reservoir; an internal seal stepped portion formed by radially outwardly expanding an opening portion of said cylinder body, said cylinder opening to a protruding mounting surface which is the end surface of an annular protruding portion entering said constant-pressure chamber; an external seal stepped portion formed by contracting radially inwardly the end portion of the external surface of said annular protruding portion; a bent portion formed at a portion of a booster shell of said booster contacting with said booster mounting surface, said bent portion being bent along the external surface of said annular protruding portion and said protruding mounting surface; a slide seal member fit in said internal seal stepped portion for fluid-tightly partitioning said drain portion and said constant-pressure chamber from each other in sliding contact with the external surface of said piston; an anti-falling-off plate sandwiched between the end surface of said annular protruding portion and said booster shell for preventing said sliding seal member from falling off, in contact with the back surface of said sliding seal member; and an air-tight seal member fit between said external seal stepped portion and said booster shell for air-tightly partitioning said constant-pressure chamber from the atmosphere.

* * * * *